Jan. 16, 1962   J. W. ASHLEY ET AL   3,016,765
GRAPHITE ASSEMBLIES FOR NUCLEAR REACTORS
Filed Feb. 12, 1959
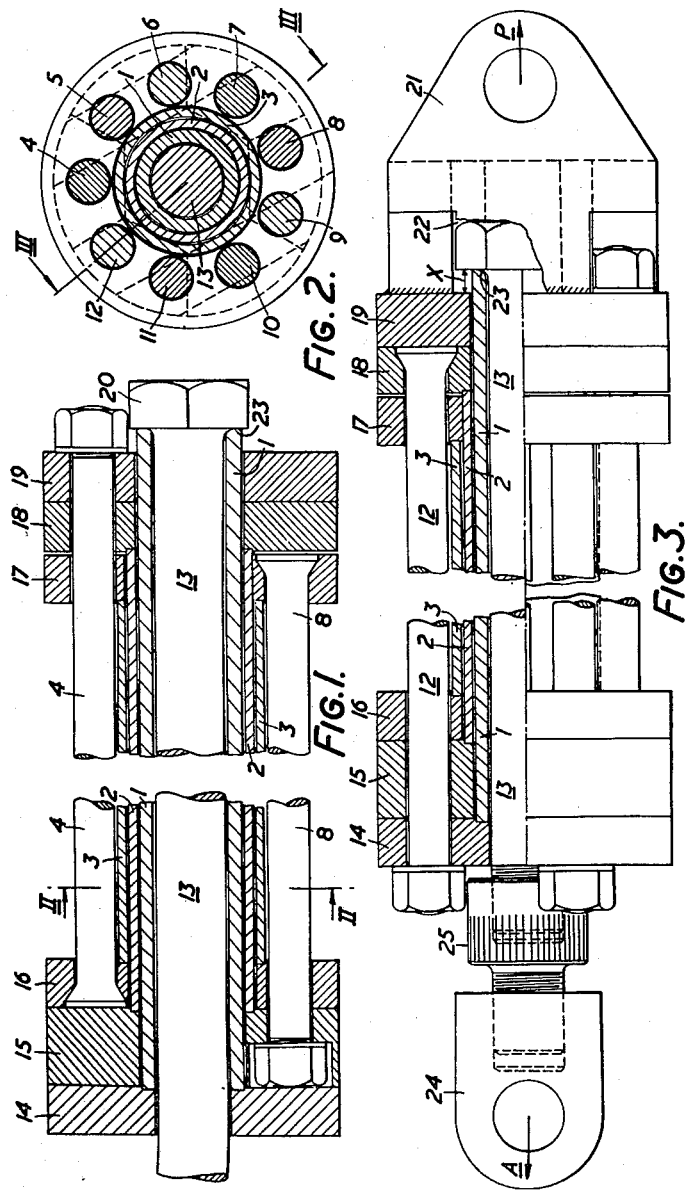
JAMES W. ASHLEY
LESLIE J. KNIGHT
INVENTORS
BY Hall-Houghton
ATTORNEY 3,016,765
GRAPHITE ASSEMBLIES FOR NUCLEAR REACTORS
James Wilfred Ashley, Dorking, and Leslie James Knight, Ashford, England, assignors to United Kingdom Atomic Energy Authority, London, England, a British authority
Filed Feb. 12, 1959, Ser. No. 792,874
Claims priority, application Great Britain Feb. 18, 1958
6 Claims. (Cl. 74—579)

The present invention relates to links for the restraint system of graphite structure of nuclear reactors.

Known nuclear reactors comprising graphite moderator and reflector structures normally employ right prisms of graphite for such structures, the prism being stacked in layers extending in the direction of the length of the prisms.

The graphite prisms comprising the moderator structure are spaced so as to accommodate directional growth of the graphite due to the phenomenon known as the Wigner effect. The resulting structure is not intrinsically stable and is rendered positively unstable by the aforementioned growth effect and by the displacement of the reactor coolant flowing through the structure. It is therefore necessary to provide stability for the graphite structure by means of a restraint system an example of which is described in U.S. Patent No. 2,865,828.

A series of resilient bands form the restraints described in U.S. Patent No. 2,865,828, and each band is made up of a series of links adapted to transmit the tensions in the band as a centripetal load to the external wall of the graphite structure. Each link comprises a nest of coaxial tubes, the tubes in each nest being end-loaded one against the other so that alternate tubes accept equal tensile and compressive loads respectively, and adjacent links in a band are coupled between the innermost tube of one link to the outermost tube of the other link.

It is an object of the present invention to provide a link for a restraint system having increased ability to function despite corrosion.

According to the present invention, a link for the restraint system for the graphite structure of a nuclear reactor comprises a nest of coaxial tubes arranged to receive compressive loads, a plurality of pairs of end plates, each tube being located between a pair of said end plates, a pair of couplings attached to the outermost pair of end plates, and a plurality of groups of solid tie rods arranged to carry tensile loads, each group of solid tie rods connecting the end plate at one end of a tube to the end plate at the other end of the adjacent inner tube and each group of solid tie rods being disposed externally of and arranged symmetrically about the nest of tubes.

In a link constructed in accordance with the invention, tensile stress applied to the link through the couplings is transmitted through the tubes as compressive stress and through the groups of tie rods as tensile stress. The arrangement of end plates provides a load path through tubes and groups of tie rods alternately.

Preferably, the tubes are nested co-axially and one set of tie rods consisting of one rod only is arranged co-axially inside the nested tubes. One of the couplings is secured to one end of the central tie rod whilst the other is attached to one of the end plates. It is desirable that the arrangement should be such that, in the event of failure of one or more of the tubes, the tensile stress is transmitted from one coupling to the other directly through the central rod.

The term end plate is used in this specification to define a member used to transmit load between a compression tube and a tie rod. The member may be in the form of a spider.

The tie rods are used instead of the tensile stressed tubes in U.S. Patent No. 2,865,828 to receive tensile loads and have a lower surface to mass ratio and hence reduce the effect of corrosion, which is essentially a surface effect.

The tie rods may be of mild steel for temperature compensating purposes, and the compression tube or tubes may be of stainless steel. Where a nest of tubes is used and the degree of temperature compensation to be achieved requires that a number of compression tubes should be of mild steel, then such tubes are arranged to be innermost tubes. Further, by arranging that the wall of each tube is thicker than that of the tube surrounding it, each tube is better able to withstand corrosion than the tube immediately surrounding it.

One embodiment of the invention will now be described by way of example with reference to the accompanying drawings in which:

FIG. 1 is a part longitudinal section of a link for a graphite restraint system, with attachment members removed, FIG. 2 is a section of the link taken at II—II of FIG. 1, and FIG. 3 is a part longitudinal half-section taken at III—III of FIG. 2 showing the link with attachment members.

The link comprises a series of six end plates 14, 15, 16, 17, 18, 19, a nest of compression tubes 1, 2, 3, and a series of ten tie rods 4, 5, 6, 7, 8, 9, 10, 11, 12, 13, rods 4–12 being symmetrically disposed in a ring round the nest of tubes, and tie rod 13 being centrally disposed along the axis of the tubes and having a hexagonal head 20 which acts as a seventh end plate.

The innermost compression tube 1 is made of mild steel and has an internal diameter of 1.520 inches and a wall thickness of 0.310 inch. The tube 1 is axially disposed within a stainless steel tube 2 having an internal diameter of 2.160 inches and a wall thickness of 0.230 inch. Similarly, the tube 2 is axially disposed within a stainless steel tube 3 of internal diameter 2.640 inches having a wall thickness of 0.200 inch.

Compression tube 1 is held between end plate 14 and hexagonal head 20 acting as an end plate, tube 2 is held between end plates 15 and 18, and tube 3 is held between end plates 16 and 17.

The mild steel tie rods 4–12, each of 0.875 inch diameter, and disposed around the nest of tubes are arranged in three groups, each group comprising three tie rods symmetrically disposed about the nest of tubes and holding one pair of end plates. Tie rods 6, 9, 12, hold end plates 14 and 18 (FIG. 3), tie rods 5, 8, 11, hold end plates 15 and 17 (FIG. 1), and tie rods 4, 7, 10, hold end plates 16 and 19 (FIG. 1). An attachment member 21 is welded to end plate 19, being formed with an internal cavity 22 (FIG. 3) to accommodate hexagonal head 20.

The central tie rod 13 is also of mild steel and is 1.500 inches in diameter. Tie rod 13 bears against end 23 of tube 1 through hexagonal head 20 and is secured at the other end to an attachment member 24 by a star nut 25.

In operation, a load applied to the link at A is reacted at P. The load is transmitted along the following load-path: From A through attachment member 24 and central tie rod 13 to hexagonal head 20, through compression tube 1 to end plate 14, through tie rods 6, 9, 12, to end plate 18, through compression tube 2 to end plate 15, through tie rods 5, 8, 11, to end plate 17, through compression tube 3 to end plate 16, and through tie rods 4, 7, 10, to end plate 19 and hence to P through attachment member 21.

When a resilient band composed of a series of links according to the present invention is used as a restraint applied to the graphite structure of a nuclear reactor, attachment member 21 of the adjacent link, so as to transmit load from A at one link to P at the adjacent link. The centripetal portion of the load is transmitted from each link to the external wall of the graphite structure through a spreader beam in the graphite wall.

In the event of failure of a link by one or more of the compression tubes 1, 2, 3, or the tie rods 4–12 yielding plastically, hexagon head 22 moves through distance X and bears against end plate 19, thus permitting direct transmission of the load from A to P through tie rod 13 which is less liable to failure through corrosion than are the other frailer members of the link, that is, compression tubes 1, 2, 3, or tie rods 4–12.

Thus the link has improved inherent safety in the event of failure of a tie rod or compression tube, since the overall tensile load will then be transmitted through the defective link via the mild steel tie rods which remain intact. This safety feature reduces the possibility of the complete failure of a band following failure of a link and so prejudicing the safety of the whole reactor assembly. It is particularly enhanced when the central tie rod is included.

Although in the embodiment described above with reference to the drawings three tubes and four sets of tie rods (one set being rod 13) are used, it will be understood that other arrangements are possible. For example, a single tube could be employed with two sets of tie rods. Each set may comprise several rods and be arranged round the tube or alternatively, one set may consist of a single rod arranged co-axially inside the tube. Three end plates are required for the construction just referred to, two plates being adjacent and one of these is attached to a coupling. The arrangement of those two plates will be similar to that of plates 19 and 20 above so that failure of the tube does not result in failure of the link as a whole.

We claim:

1. A link for a restraint system for the graphite structure of a nuclear reaction comprising a nest of coaxial tubes arranged to receive compressive loads, a plurality of pairs of end plates, each tube being located between a pair of said end plates, a pair of couplings attached to the outermost pair of end plates, and a plurality of groups of solid tie rods arranged to carry tensile loads, each group of solid tie rods connecting the end plate at one end of a tube to the end plate at the other end of the adjacent inner tube, and each group of solid tie rods being disposed externally of and arranged symmetrically about the nest of tubes.

2. A link as claimed in claim 1, wherein one of said end plates is connected by an additional solid tie rod disposed coaxially within the nest of tubes to one of said pair of couplings.

3. A link as claimed in claim 2, wherein one end of the single central tie rod is connected to said one of said pair of couplings through apertures in adjacent end plates, and the end plates at the other end of the link are arranged so that in the event of failure of one or more of the tubes, the end plate at the other end of the single central tie rod bears against the end plate associated with the second of said couplings whereby tensile stress is transmitted directly through the link by the central tie rod.

4. A link as claimed in claim 1, wherein the tie rods are made of mild steel and the tubes are made of stainless steel.

5. A link as claimed in claim 2, wherein the tie rods are made of mild steel and the tubes are made of stainless steel.

6. A link as claimed in claim 3, wherein the tie rods are made of mild steel and the tubes are made of stainless steel.

References Cited in the file of this patent

UNITED STATES PATENTS

| | | |
|---|---|---|
| 334,958 | Mahony | Jan. 26, 1886 |
| 2,391,275 | Shaw | Dec. 18, 1945 |
| 2,534,791 | Moyer | Dec. 19, 1950 |
| 2,851,903 | Norris et al. | Sept. 16, 1958 |
| 2,865,828 | Long et al. | Dec. 23, 1958 |

OTHER REFERENCES

Bureau of Standards—Circular No. 58—1st edition 58–133, page 59, April 4, 1916.